US011237608B2

(12) United States Patent
Matula et al.

(10) Patent No.: US 11,237,608 B2
(45) Date of Patent: Feb. 1, 2022

(54) SYSTEM AND METHOD FOR ENABLING A PERIPHERAL DEVICE EXPANSION CARD WITHOUT SIDEBAND CABLE CONNECTION

(71) Applicant: DELL PRODUCTS, LP, Round Rock, TX (US)

(72) Inventors: Terry Matula, Austin, TX (US); Yimin Xiao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 53 days.

(21) Appl. No.: 16/868,072

(22) Filed: May 6, 2020

(65) Prior Publication Data
US 2021/0349513 A1    Nov. 11, 2021

(51) Int. Cl.
*G06F 1/28*    (2006.01)
*G06F 1/18*    (2006.01)
*G06F 1/26*    (2006.01)

(52) U.S. Cl.
CPC .............. *G06F 1/28* (2013.01); *G06F 1/185* (2013.01); *G06F 1/186* (2013.01); *G06F 1/189* (2013.01); *G06F 1/266* (2013.01)

(58) Field of Classification Search
CPC . G06F 1/28; G06F 1/266; G06F 1/185; G06F 1/186; G06F 1/189
See application file for complete search history.

(56) References Cited

U.S. PATENT DOCUMENTS

| | | | |
|---|---|---|---|
| 10,317,973 B2 | 6/2019 | Xiao et al. | |
| 2017/0300264 A1* | 10/2017 | Hsiao | G06F 3/0604 |
| 2018/0183758 A1* | 6/2018 | Itkin | H04L 41/28 |
| 2018/0293197 A1 | 10/2018 | Grobelny et al. | |
| 2019/0278350 A1 | 9/2019 | Xiao et al. | |
| 2020/0341929 A1* | 10/2020 | Lambert | G06F 13/385 |

* cited by examiner

Primary Examiner — Glenn A. Auve
(74) Attorney, Agent, or Firm — Larson Newman, LLP

(57) ABSTRACT

An information handling system includes a system board configured to serialize sideband signals from a sideband cable resulting in serialized sideband signals, and a peripheral device expansion card that has a power management embedded controller. If the sideband cable is connected to the peripheral device expansion card, then the controller may transmit the sideband signals to a card controller. If the sideband cable is not connected to the peripheral device expansion card, then the controller may decode and parallelize the serialized sideband signals resulting in parallelized sideband signals, and transmit the parallelized sideband signals to the controller. The controller determines a power state of the information handling system based on the sideband signals from the sideband cable or the parallelized sideband signals.

20 Claims, 3 Drawing Sheets

SYSTEM AND METHOD FOR ENABLING A PERIPHERAL DEVICE EXPANSION CARD WITHOUT SIDEBAND CABLE CONNECTION

FIELD OF THE DISCLOSURE

The present disclosure generally relates to information handling systems, and more particularly relates to enabling a peripheral device expansion card without sideband cable connection.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a system board configured to serialize sideband signals from a sideband cable resulting in serialized sideband signals, and a peripheral device expansion card that has a power management embedded controller. If the sideband cable is connected to the peripheral device expansion card, then the controller may transmit the sideband signals to a card controller. If the sideband cable is not connected to the peripheral device expansion card, then the controller may decode and parallelize the serialized sideband signals resulting in parallelized sideband signals, and transmit the parallelized sideband signals to the controller. The controller determines a power state of the information handling system based on the sideband signals from the sideband cable or the parallelized sideband signals.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
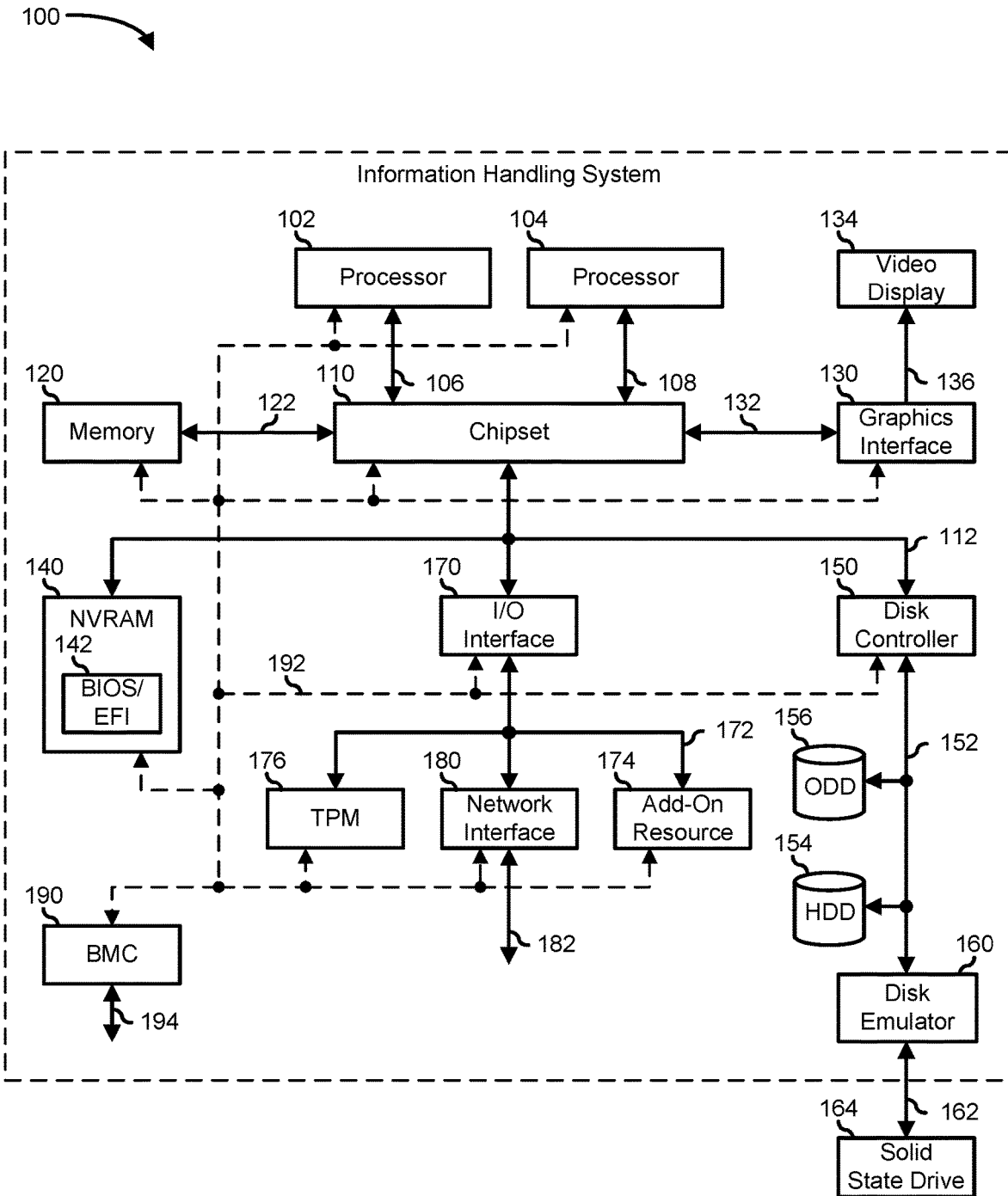
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like. NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage card, another add-on resource, or a combination thereof. Add-on resource 174 can be on a main circuit board, on separate circuit board or add-in card disposed within information handling system 100, a dev system, an additional graphics interface, a network interface card (NIC), a sound/video processing ice that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBus), a Power Management Bus (PMBus), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Conventional Thunderbolt™ peripheral device expansion cards, also referred to as Thunderbolt add-in cards, generally utilize a PCIe connection and a sideband connection. A sideband cable is used by a Thunderbolt™ peripheral device expansion card or simply a peripheral device expansion card to receive sideband signals via the sideband connection. The sideband signals include signals that are not in the standard PCIe specification but may be desirable for the peripheral device expansion card to function properly. However, using the sideband cable may pose some challenges such as in baseboard trace routing, in placement of the peripheral device expansion card, and in additional cost of the sideband cable. Also, requiring the use of the sideband cable may be subject to user error. For example, a user who is unaware of the sideband cable requirement may neglect to use the sideband cable which may cause the peripheral device expansion card to malfunction. To mitigate these challenges, the current system and method may leverage an SMBus in a PCIe expansion slot to pass the signals that may not be in the standard PCIe specification but are desirable for the peripheral device expansion card to properly function. The PCIe expansion slot of system board 260 may be a PCIe compliant component and compatible with standard PCIe form factors such as expansion card 205.

Figure 2:
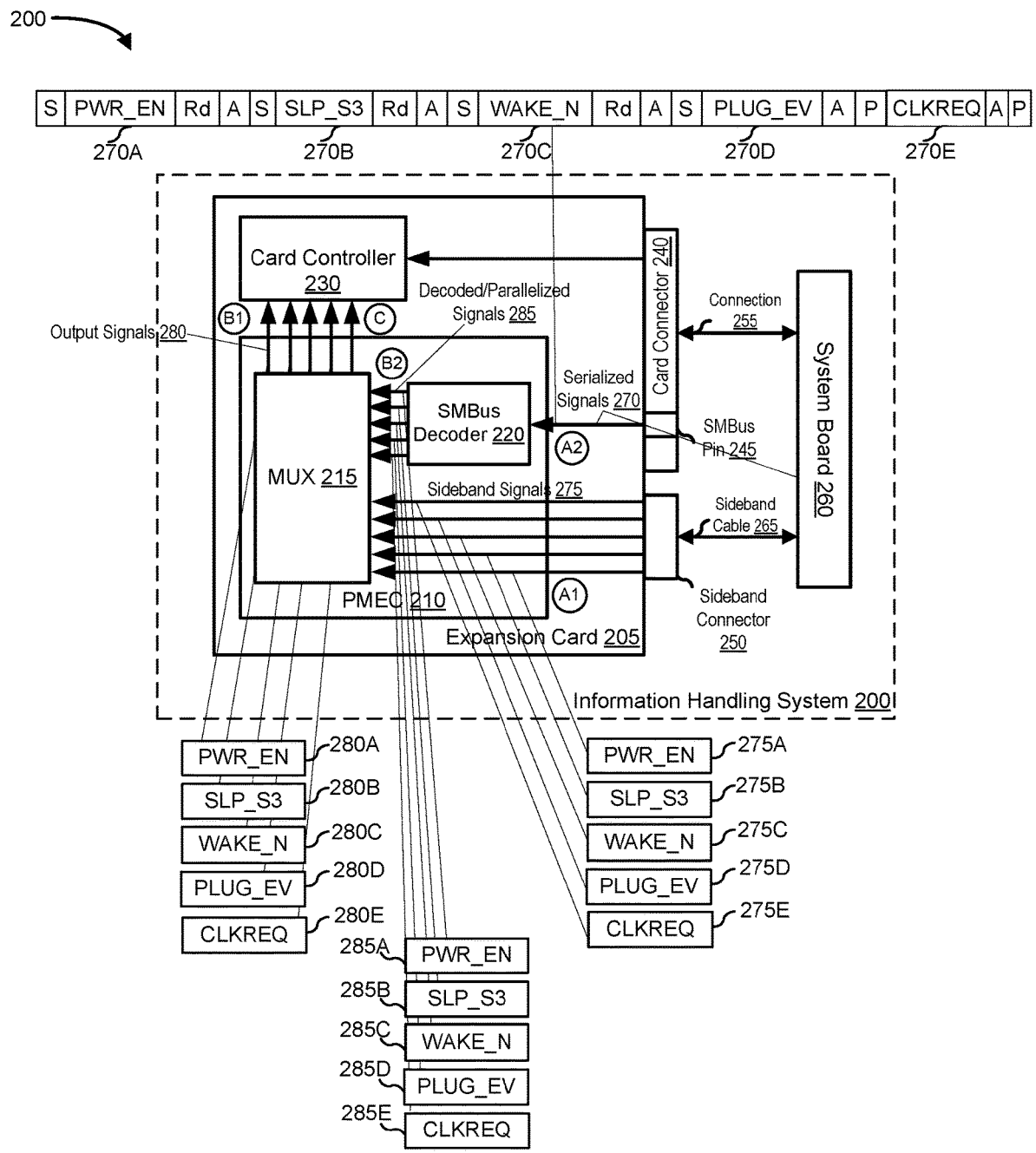
FIG. 2 is a block diagram illustrating an example of a system for enabling a peripheral device expansion card without sideband cable connection, according to an embodiment of the present disclosure.

FIG. 2 illustrates an information handling system 200 for enabling usage of a peripheral device expansion card without requiring a sideband cable connection. Information handling system 200, which is similar to information handling system 100 of FIG., includes a system board 260 and an expansion card 205. Expansion card 205 includes a power management embedded controller (PMEC) 210, a card connector 240, a sideband connector 250, and a card controller 230.

Expansion card 205 may be a PCIe expansion card such as a Thunderbolt peripheral device expansion card or in particular a Thunderbolt 4 add-in card. Expansion card 205 may have one or more connectors such as card connector 240 and sideband connector 250. The aforementioned connectors may be located at an edge of expansion card 205. Card connector 240 may be a PCIe expansion bus connector, such as a 4-lane PCIe connector that complies with PCIe specification, although other types of expansion bus connectors will fall within the scope of the present disclosure. Card connector 240 may be coupled to system board 260 through one or more expansion slots such as PCIe expansion slots. For example, card connector 240 may be coupled to system board 260 via a PCIe slot through connection 255. While only one SMBus pin, that is SMBus pin 245, is shown on card connector 240, the card connector may include additional SMBus pins as described in the PCIe specification. Expansion card 205 may also be coupled to system board 260 via a sideband cable 265 through sideband connector 250. Expansion card 205 may also include one or more digital audio/video connectors such as DisplayPort connectors, although other peripheral device connectors will fall within the scope of the present disclosure as well.

Expansion card 205 may include PMEC 210 which maybe a centralized embedded controller configured for managing power of expansion card 205. PMEC 210 may manage the power of expansion card 205 based on sideband signals 275 which includes sideband signals 275(A)-275(D). In addition, PMEC 210 may be configured to determine whether sideband cable 265 is connected to sideband connector 250 based on a detection pin on sideband connector 250. The detection pin may also be located at sideband cable 265. If PMEC 210 determines that sideband cable 265 is connected to sideband connector 250, then PMEC 210 may be configured as a pass-through and output the sideband signals 275 to card controller 230 via multiplexer 215. If PMEC 210 determines that sideband cable 265 is not connected to sideband connector 250, then PMEC 210 may read serialized signals 270 from card connector 240 via SMBus pin 245. As shown, serialized signals 270 includes signals 270A-270D. In another embodiment, PMEC 210 may read serialized signals 270 from the PCIe expansion slot in system board 260. Serialized signals 270 may be similar to sideband signals 275.

Sideband cable 265 may be utilized to transmit sideband signals 275 which may be power state signals. The power state signals may be used by card controller 230 to determine the power state of information handling system 200. Sideband signals 275 may also include a "force power" signal that may cause expansion card 205 to utilize auxiliary power to remain powered even when disconnected from information handling system 200 such as for debugging purposes. PMEC 210 may receive serialized signals 270 from system board 260 in addition to receiving sideband signals 275. In another embodiment, system board 260 may not transmit serialized signals 270 when sideband cable 265 is connected to sideband connector 250 or sideband signals 275 is detected, thus PMEC 210 may not receive serialized signals 270 when sideband cable 265 is connected to sideband connector 250.

PMEC 210 may include an SMBus decoder 220 which may be configured to decode and parallelize serialized signals, such as serialized signals 270 which may be read or received from system board 260 via SMBus pin 245. SMBus pin 245 may be the A6 pin, also referred to as the SMDAT pin, on a 4-lane PCIe connector such as card connector 240. Card connector 240 may also include another SMBus pin such as an A5 pin also referred to as SMCLK pin. Serialized signals 270 may be serialized sideband signals similar to sideband signals 275. SMBus decoder 220 may provide an output such as decoded/parallelized signals 285, which is based from serialized signals 270, to multiplexer 215. As shown, decoded/parallelized signals 285 includes decoded/parallelized signals 285A-285D. Multiplexer 215 may be configured to receive multiple inputs and determine which one of the inputs to provide as an output to card controller 230. In particular, multiplexer 215 may be configured to receive sideband signals 275 from sideband connector 250 and decoded/parallelized signals 285 from SMBus decoder 220. Multiplexer 215 may then be configured to output one of the received signals to card controller 230. As illustrated, multiplexer 215 may be between sideband connector 250 and card controller 230. Multiplexer 215 may also be between SMBus decoder 220 and card controller 230.

Card controller 230 may be a Thunderbolt chipset also referred to as a Thunderbolt controller configured to determine information based on multiplexed signals, that is signals received from multiplexer 215, such as output signals 280 that includes output signals 280A-280D. For example, card controller 230 may use the signal 280A (PWR_EN) to determine the power state of information handling system 200. Also, card controller 230 may use output signal 280B (SLP_S3) to determine whether information handling system 200 is in a sleep state. In addition, card controller 230 may use output signal 280C (WAKE_N) to determine whether to turn off the clock or not. Finally, card controller 230 may use output signal 280D (PLUG_EV) to determine whether a Thunderbolt device is plugged or unplugged that may trigger a device scan to update the latest attached device list. Output signals 280A-280D are used to illustrate one example to aid in understanding the present disclosure and should not be used to limit the claims. Output signals 280A-280D may include more or fewer signals than shown in the present disclosure.

While the present disclosure shows expansion card 205 as a PCIe expansion card, one of skill in the art will recognize that other systems that utilize other types of conventional peripheral expansion card systems may benefit from the teaching of the present disclosure and fall within its scope. For example, the TERA2240 Host Card from Leadtek Research Inc. of New Taipei, Taiwan, provides a Teradici workstation remote control PCIe add-in card that includes a sideband cable to enable power button functionality.

FIG. 2 is annotated with a series of letters A1/A2, B1/B2 and C. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

The present disclosure replaces the functionality provided by a sideband cable by leveraging the SMBus in a PCIe expansion slot of system board 260 to transmit serialized information between system board 260 and expansion card 205, such as serialized signals 270. In particular, expansion card 205 may leverage SMBus pin 245 in card connector 240 to transmit serialized signals 270 between system board 260 and expansion card 205. System board 260 may serialize sideband signals 275 resulting in serialized signals 270. Serialized signals may be in a standard that can be decoded by SMBus decoder 220. In another embodiment, the present disclosure, PMEC 210 may pass-through sideband signals 275 to card controller 230 if PMEC 210 detects sideband signals 275 in sideband connector 250.

In one embodiment, at stage A1, PMEC 210 detects sideband cable 265 is connected to sideband connector 250. In addition, PMEC 210 receives sideband signals 275 from sideband cable 265 via sideband connector 250. Sideband signals 275 may be a first input to multiplexer 215. PMEC 210 may also receive serialized signals 270. SMBus decoder 220 may be configured to not decode serialized signals 270 if sideband cable 265 is detected. In another embodiment, SMBus decoder 220 may decode and parallelize serialized signals 270 and outputs decoded/parallelized signals 285, which may be a second input to multiplexer 215. In another embodiment, system board 260 may be configured not to serialize sideband signals 275 if sideband cable 265 is detected. At stage B1, PMEC 210 passes through sideband signals 275 to card controller 230 as output signals 280 via multiplexer 215. Such may be performed by PMEC 210 based on the determination that sideband cable 265 is connected to sideband connector 250 or that sideband signals 275 is detected.

In another embodiment, at stage A2, PMEC 210 does not detect sideband cable 265. PMEC 210 also reads serialized signals 270 at system board 260. In another embodiment, PMEC 210 receives serialized signals 270 from system board 260 via SMBus pin 245. At stage B2, SMBus decoder 220 decodes and parallelizes serialized signals 270 and outputs decoded/parallelized signals 285. Decoded/parallelized signals 285 is then transmitted as an input to multiplexer 215. At stage C, multiplexer 215 provides decoded/parallelized signals 285 as output signals 280 to card controller 230.

Figure 3:
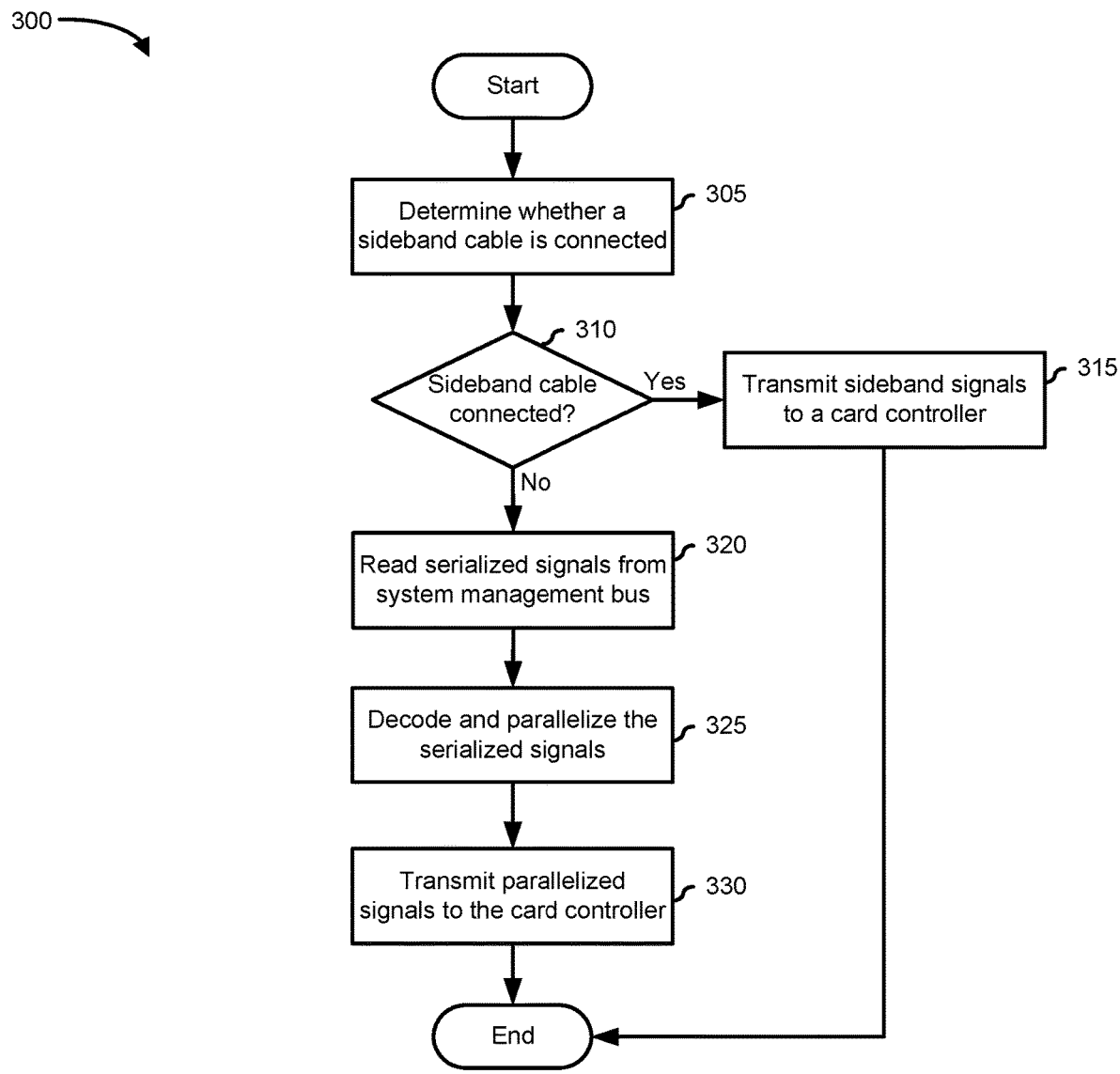
FIG. 3 is a flowchart illustrating an example of a method for enabling a peripheral device expansion card without sideband cable connection, according to an embodiment of the present disclosure.

FIG. 3 illustrates a method 300 for enabling usage of a peripheral device expansion card without a sideband cable connection. Method 300 may be performed by one or more components of information handling system 200 of FIG. 2. For example, method 300 may be performed by expansion card 205 or one or more of its components. Method 300 starts at block 305 where the method determines whether a sideband cable is connected to the expansion card. The method 300 may determine whether the sideband cable is connected based on a detection pin. The detection pin may be an additional contact that allows method 300 to detect whether the sideband cable is connected to a sideband connector of the expansion card. The detection pin may also be referred to as a detection tip or a detection sleeve. In another embodiment, the method 300 determines whether there is a sideband signal at the sideband connector. The method 300 proceeds to decision block 310 to determine whether the sideband cable is connected. If the method 300 determines that the sideband cable is connected, then the "YES" branch is taken and the method proceeds to block 315. If the method 300 determines that the sideband cable is not connected, then the "NO" branch is taken and the method proceeds to block 320. Blocks 305 and 310 may be performed by a PMEC associated with the expansion card.

At block 315, the method 300 transmits the sideband signals from the sideband cable to a card controller. The PMEC or a multiplexer in particular may be a pass-through and outputs the sideband signals to the card controller. At block 320, the method 300 reads serialized sideband signals at the SMBus in the PCIe expansion slot at the system board. The serialized sideband signals may be serialized by the system board and made available for reading at the PCIe expansion slot. In another embodiment, the system board may transmit the serialized sideband signals to the expansion card via the SMBus of the PCIe connector corresponding to the PCIe expansion slot. The PMEC or in particular the SMBus decoder may receive the serialized sideband signals.

The method proceeds to block 325 where the method 300 may decode and parallelize the serialized signals. For example, the method may parse the serialized signals and determine each discrete signal. The method 300 may then transmit each discrete signal in parallel to a multiplexer. The discrete signals transmitted in parallel may also be referred to as parallelized signals. Block 325 may be performed by the PMEC or the SMBus decoder in particular. The method 300 then proceeds to block 330 where the method 300 or in particular the multiplexer may transmit the parallelized signals to the card controller.

Although FIG. 3 shows example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, block 320 and block 325 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
a system board configured to serialize sideband signals from a sideband cable resulting in serialized sideband signals;
a peripheral device expansion card coupled to the system board and including a power management embedded controller configured to:
if the sideband cable is connected to the peripheral device expansion card, then transmit the sideband signals to a card controller; and
if the sideband cable is not connected to the peripheral device expansion card, then decode and parallelize the serialized sideband signals resulting in parallelized sideband signals, and transmit the parallelized sideband signals to the card controller; and
the embedded controller configured to determine a power state of the information handling system based on the sideband signals from the sideband cable or the parallelized sideband signals.

2. The information handling system of claim 1, wherein the embedded controller is further configured to read the serialized sideband signals from a system management bus.

3. The information handling system of claim 2, wherein the system management bus is disposed in a peripheral component interconnect-express expansion slot located in the system board.

4. The information handling system of claim 1, wherein the embedded controller is further configured to detect a detection pin at a sideband connector located at the peripheral device expansion card.

5. The information handling system of claim 4, wherein the embedded controller is further configured to detect the sideband signals at the sideband connector.

6. The information handling system of claim 1, wherein the sideband signals and the parallelized sideband signals are transmitted to the embedded controller via a multiplexer.

7. A method comprising:
determining, by a power management embedded controller, whether a sideband cable is connected to a peripheral device expansion card via a sideband connector, wherein the power management embedded controller is located at the peripheral device expansion card;
if the sideband cable is connected to the peripheral device expansion card, then transmitting sideband signals from the sideband cable to a card controller for determining a power state of an information handling system; and
if the sideband cable is not connected to the peripheral device expansion card, then transmitting parallelized sideband signals to the card controller for the determining the power state of the information handling system, wherein the parallelized sideband signals were decoded and parallelized from serialized sideband signals, and wherein the serialized sideband signals were serialized by a system board coupled to the peripheral device expansion card.

8. The method of claim 7, further comprising reading the serialized sideband signals from a system management bus.

9. The method of claim 8, wherein the system management bus is in a peripheral component interconnect-express slot in the system board.

10. The method of claim 7, further comprising detecting a detection pin at the sideband connector.

11. The method of claim 10, further comprising determining whether the sideband cable is connected to the sideband connector based on the detecting the detection pin at the sideband connector.

12. The method of claim 7, further comprising if the sideband signals are missing, then reading serialized information from a peripheral component interconnect-express expansion slot in the system board, wherein the serialized information is based on the sideband signals.

13. A peripheral device expansion card to be coupled to an information handling system, comprising:
a power management embedded controller configured to determine whether a sideband cable is connected to a sideband connector of the peripheral device expansion card, the power management embedded controller is further configured to read serialized sideband signals from a serialized management bus;
a serial decoder configured to decode and parallelize the serialized sideband signals resulting in parallelized sideband signals, the serial decoder further configured to transmit the parallelized sideband signals to a multiplexer;
the multiplexer configured to, if the sideband cable is connected to the sideband connector, then transmit sideband signals from the sideband cable to a card controller, wherein the multiplexer is further configured to, if the sideband cable is not connected to the sideband connector, then transmit the parallelized sideband signals to the card controller; and
the card controller configured to receive one of the sideband signals from the sideband cable or the parallelized sideband signals, wherein the card controller is further configured to determine a power state of the information handling system based on the one of the sideband signals from the sideband cable or the parallelized sideband signals.

14. The peripheral device expansion card of claim 13, wherein the power management embedded controller is further configured to detect a detection pin at the sideband connector.

15. The peripheral device expansion card of claim 13, wherein the multiplexer is located between the serial decoder and the card controller.

16. The peripheral device expansion card of claim 13, wherein the multiplexer is located between the sideband connector and the card controller.

17. The peripheral device expansion card of claim 13, wherein the serial decoder is located between the multiplexer and a peripheral component interconnect-express connector.

18. The peripheral device expansion card of claim 13, wherein the peripheral device expansion card includes a peripheral component interconnect-express connector and the sideband connector.

19. The peripheral device expansion card of claim 13, wherein the power management embedded controller is further configured as a pass-through and output the sideband signals to the card controller.

20. The peripheral device expansion card of claim 13, wherein the the peripheral device expansion card is further configured to utilize auxiliary power from parallelized sideband signals to remain powered on when disconnected from the information handling system.

* * * * *